U S009940719B2

United States Patent
Kneepkens

(10) Patent No.: US 9,940,719 B2
(45) Date of Patent: *Apr. 10, 2018

(54) ALIGNMENT OF AN ORDERED STACK OF IMAGES FROM A SPECIMEN

(71) Applicant: KONINKLIJKE PHILIPS N.V., Eindhoven (NL)

(72) Inventor: Rik E. J. Kneepkens, Weert (NL)

(73) Assignee: Koninklijke Philips N.V., Eindhoven (NL)

( * ) Notice: Subject to any disclaimer, the term of this patent is extended or adjusted under 35 U.S.C. 154(b) by 0 days.

This patent is subject to a terminal disclaimer.

(21) Appl. No.: 14/806,777

(22) Filed: Jul. 23, 2015

(65) Prior Publication Data

US 2015/0356718 A1    Dec. 10, 2015

Related U.S. Application Data

(62) Division of application No. 13/502,530, filed as application No. PCT/IB2010/054648 on Oct. 14, 2010, now Pat. No. 9,159,130.

(30) Foreign Application Priority Data

Oct. 22, 2009  (EP) ..................................... 09173803

(51) Int. Cl.
  *G06K 9/00*   (2006.01)
  *G06T 7/00*   (2017.01)
  (Continued)

(52) U.S. Cl.
  CPC ............ *G06T 7/003* (2013.01); *G06K 9/0014* (2013.01); *G06K 9/6203* (2013.01); *G06T 7/30* (2017.01);
  (Continued)

(58) Field of Classification Search
  CPC ... H04N 21/44008; G01S 17/42; G01S 17/89; G06K 2209/01
  (Continued)

(56) References Cited

U.S. PATENT DOCUMENTS 5,072,293 A  12/1991 De Haan
5,453,840 A  9/1995 Parker et al.
(Continued)

FOREIGN PATENT DOCUMENTS

JP  2005323994 A  11/2005
JP  2007233833 A  9/2007
(Continued)

OTHER PUBLICATIONS

Fiala, John C. et al. "Computer-Based Alignment and Reconstruction of Serial Sections", Microscopy and Analysis, Jan. 202, pp. 5-7.
(Continued)

*Primary Examiner* — Yosef Kassa

(57) ABSTRACT

A method and apparatus include and aligner configured to align an ordered stack of images by successively determining, for at least two already aligned images of the ordered stack, the respective misalignments with an unaligned image which is to be aligned next, and a selector configured to select from the at least two aligned images as a reference image that aligned image with which the unaligned image has the smallest amount of misalignment. The unaligned image is then aligned with the selected reference image.

18 Claims, 3 Drawing Sheets

(51) Int. Cl.
 *G06K 9/62* (2006.01)
 *G06T 7/30* (2017.01)
 *G06T 7/33* (2017.01)

(52) U.S. Cl.
 CPC .... *G06T 7/337* (2017.01); *G06T 2207/10016* (2013.01); *G06T 2207/20021* (2013.01); *G06T 2207/30024* (2013.01)

(58) Field of Classification Search
 USPC ....... 382/128, 131, 132, 154, 159, 209, 284, 382/294; 128/922, 923
 See application file for complete search history.

(56) References Cited

U.S. PATENT DOCUMENTS

| | | | |
|---|---|---|---|
| 5,568,384 | A | 10/1996 | Robb |
| 6,445,761 | B1* | 9/2002 | Miyazaki ............... A61B 6/032 378/16 |
| 6,452,969 | B1* | 9/2002 | Yim ....................... H04N 19/51 375/240.02 |
| 6,614,923 | B1* | 9/2003 | Shishido ................ G06T 5/006 382/144 |
| 6,625,332 | B1 | 9/2003 | Nakao |
| 7,081,750 | B1* | 7/2006 | Zhang ................... G01R 33/54 324/309 |
| 7,106,891 | B2* | 9/2006 | Wyman ................. G06T 7/0026 382/128 |
| 7,194,118 | B1* | 3/2007 | Harris ................ G06K 9/00134 382/128 |
| 7,333,677 | B2* | 2/2008 | Sakai ............... G01N 21/95607 358/450 |
| 7,374,907 | B1* | 5/2008 | Voneiff .................... G01N 1/06 156/64 |
| 7,468,837 | B2* | 12/2008 | Brooker ............. G02B 21/0076 250/458.1 |
| 7,720,148 | B2* | 5/2010 | Au ....................... H04N 19/573 375/240.12 |
| 7,738,683 | B2 | 6/2010 | Cahill et al. |
| 7,773,828 | B2* | 8/2010 | Sakata ............... H04N 5/23248 345/634 |
| 7,813,559 | B2* | 10/2010 | Duquette ................ G06K 9/00 382/151 |
| 7,840,300 | B2* | 11/2010 | Harker ................... G01N 1/286 700/112 |
| 8,099,152 | B2* | 1/2012 | Bova .................. G06F 19/3437 600/407 |
| 8,225,656 | B2 | 7/2012 | Kato et al. |
| 8,290,303 | B2 | 10/2012 | Washburn et al. |
| 8,442,285 | B2* | 5/2013 | Madabhushi ........ G06K 9/6231 382/128 |
| 8,452,126 | B2* | 5/2013 | Jhunjhunwala ........... G06T 7/33 382/131 |
| 8,472,683 | B2* | 6/2013 | Manjeshwar ............. G06T 7/33 382/128 |
| 8,501,285 | B2* | 8/2013 | Haseba .................. C09K 19/20 252/299.01 |
| 8,649,611 | B2* | 2/2014 | Everett .................. A61B 3/113 382/131 |
| 2007/0171220 | A1 | 7/2007 | Kriveshko |
| 2008/0056613 | A1 | 3/2008 | Hatanaka |
| 2008/0112644 | A1 | 5/2008 | Yokohata et al. |
| 2008/0144716 | A1 | 6/2008 | De Haan |
| 2009/0245692 | A1 | 10/2009 | Okutomi et al. |

FOREIGN PATENT DOCUMENTS

| | | |
|---|---|---|
| JP | 2008044026 A | 2/2008 |
| WO | 2008080403 A1 | 7/2008 |

OTHER PUBLICATIONS

De Haan, Gerard et al., "Sub-Pixel Motion Estimation with 3_d Recursive Search Block Matching", Signal Processing Image Communication, vol. 6, 1994, pp. 229-239.

Lowe, David G., "Object Recognition from Local Scale Invariant Features", Prov. of the International Conf. on Computer Vision. 1999, pp. 1150-1157 (1-8).

Yushkevich, Paul A. et al., "3D Mouse Brain Reconstruction from Histology using a Coarse-to-Fine Approach", Jan. 2006, Biomedical Image Registration Lecture Notes in Computer Science, pp. 230-237.

Carlbom, Ingrid et al., "Computer-Assisted Registration, Segmentation, and 3 D Reconstruction from Images of Neuronal Tissue Sections", IEEE Transactions on Medical Imaging, vol. 13, No. 2, Jun. 1994, pp. 351-362.

Bollenbeck, F. et al., "Fast Registration-Based Automatic Segmentation of Serial Section Images for High-Resolution 3-D Plant Seed Modeling", IEEE International Symposium on Biomedical Imaging, 2008, pp. 352-355.

Porter, Brian C. et al., "Histology and Ultrasound Fusion of Excised Prostate Tissue using Surface Registration", 2001 IEEE Ultrasonics Symposium, pp. 1473-1476.

Meruvia-Pastor, Oscar et al., "Fast Interactive Integration of Cross-Sectional Image Datasets and Surface Data for Morphometric Analysis", Sun Center of Excellence for Visual Genomics, Depart. of Biochemistry and Molecular Biology, University of Calgary, 2006.

Bajcsy, P. et al. "Three Dimensional Volume Reconstruction of Extracellular Matrix Proteins in Uveal Melanoma from Fluorescent Confocal Laser Scanning Microscope Images", Journal Microscopy, Jan. 2006, vol. 221, (PT.1):30-45, pp. 1-34.

Dehaan, Gerard et al. "True Motion Estimation with 3-D Recursive Search Block Matching", IEEE Transactions on Circuits and Systems for Video Technology, vol. 3, No. 5, Oct. 1993, pp. 368-379.

Lowe, David G., "Distinctive Image Features from Scale Invariant Keypoints", International Journal of Computer Vision, 2004, pp. 91-110.

* cited by examiner

ALIGNMENT OF AN ORDERED STACK OF IMAGES FROM A SPECIMEN

This application is a divisional of application Ser. No. 13/502,530, filed Apr. 18, 2012, which entered the U.S. national stage from PCT/IB2010/054648, filed Oct. 14, 2010 and claims the benefit of EP Application No. 09173803.9, filed Oct. 22, 2009.

FIELD OF THE INVENTION

The present invention relates to the field of alignment of an ordered stack of images from a specimen, and more specifically to method and apparatus for aligning an ordered stack of images from a sliced specimen.

BACKGROUND OF THE INVENTION

Specimens are sliced and imaged for analysis purposes as well as teaching purposes. With a stack of images that describe a sliced specimen one can create synthetic views of that specimen to analyze the structure and anatomy of the specimen. After cutting the specimen in the lab e.g. from a paraffin block, the common coordinate system of the sliced specimen is lost which causes misalignment in the images of the stack. This loss results in translational and rotational differences between the images of the stack. Another misalignment source can come from the slice preparation which is based on manually performed steps. Translation, scaling and stretching can occur. Furthermore, deformations such as stretched tissue, broken tissue and absent tissue can be found.

To align the histology slices of the specimen in the digital domain (i.e. after imaging) it is required to counteract the results of the deformation process as well as the loss of the common coordinate system. A typical solution for alignment is to add markers as artificial fiducials in the specimen block during preparation, e.g. by embedding markers in the paraffin, that are detected after imaging. The positions of these markers can then be used for calculating transformation parameters. However, such additional markers results in an additional preparation step. Furthermore, the storage space for storing the images after digitization increases because additional area is imaged for capturing the markers that are added alongside the real specimen. Therefore, it is desirable to align an ordered stack of images without usage of additional markers in the specimen block.

The article "Computer-Based Alignment and Reconstruction of Serial Sections", John C. Fiala and Kirsten M. Harris, Boston University, Microscopy and Analysis, pages 5-7, January 2002, describes a way to align an series of images without having to add additional markers in the specimen block. For the alignment, images are transformed by computation from a set of point correspondences entered by the user. For aligning the series of images, an alignment process is repeated, wherein an image to be aligned next is aligned with the image aligned immediately before.

Additionally to the above cited reference, further references are mentioned in the following paragraphs:

Gerard de Haan et al, "True motion estimation with 3D-recursive search block matching", IEEE transactions on circuits and systems of video technology, volume 3, number 5, October 1993;
U.S. Pat. No. 5,072,293;
US2008/0144716A1;
David G. Lowe, "Object recognition from local scale-invariant features," International Conference on Computer Vision, 1999, pages 1150-1157; and
David G. Lowe, "Distinctive image features from scale-invariant keypoints," International Journal of Computer Vision, 2004, pages 91-110.

SUMMARY OF THE INVENTION

However, without usage of additional markers in the specimen block, various local deformations, such as missing and broken tissue, make it difficult to align every image of the sliced specimen robustly.

Given the large size of pathology images, typically 64 k×64 k pixels, the computational requirements for automated alignment are getting critical. Thus, fast alignment procedures which ease the computational demands are highly desirable.

It would be advantageous to achieve a method for aligning an ordered stack of images from a specimen and to achieve an aligning apparatus which enable a robust alignment of the ordered stack of images and which may enable a fast alignment with low computational demands.

To better address one or more of these concerns, in a first aspect of the invention it is presented a method for aligning an ordered stack of images from a specimen, comprising the successive steps of a) determining, for at least two already aligned images of the ordered stack, the respective misalignments with an unaligned image which is to be aligned next in the ordered stack; b) from the at least two aligned images, selecting as a reference image that aligned image having the smallest amount of misalignment with the unaligned image; and c) aligning the unaligned image with the selected reference image.

To further address one or more of these concerns, in a second aspect of the present invention it is presented an apparatus for aligning an ordered stack of images from a specimen, comprising the following devices: a determiner for determining, for at least two already aligned images of the ordered stack, the respective misalignments with an unaligned image which is to be aligned next in the ordered stack; a selector for selecting, from the at least two aligned images, as a reference image that aligned image having the smallest amount of misalignment with the unaligned image; and an aligner for aligning the unaligned image with the selected reference image.

Determining at least two misalignments for each image to be aligned may provide a robust way of aligning. Selecting as the reference image for alignment the aligned image providing the smallest amount of misalignment may also ensure a robust way of aligning. Solely aligning the unaligned image with the selected reference image, which implies only one computationally demanding transformation from the unaligned image into an aligned image, may provide simplified computational demands and may further allow fast alignment.

According to at least one embodiment, the respective misalignments are determined by motion estimation so that each misalignment is described by an estimated displacement field. This may allow a fast determining of the respective misalignments and achieve simplified computational demands.

According to at least one embodiment, the displacement field comprises at least one displacement vector describing how to shift pixels in the image to be aligned in order to align this image to the selected reference image. This also may allow a fast determining of the respective misalignments and achieve simplified computational demands.

According to at least one embodiment, the aligned images and the unaligned image to be aligned next are divided into blocks, and the respective displacement fields are obtained by a block matching algorithm. This may further increase the robustness of alignment.

According to at least one embodiment, the respective amounts of misalignment are calculated in terms of a respective matching error between the respective aligned image and the unaligned image to be aligned next, wherein the matching errors are calculated based on a predetermined matching criterion, and wherein the aligned image having the smallest matching error is selected as the reference image. This feature also may allow a fast determining of the respective misalignments and to achieve simplified computational demands.

According to at least one embodiment, the aligning of the unaligned image with the selected reference image comprises transforming the unaligned image based on transformation parameters describing how the unaligned image has to be transformed in order to achieve alignment with the selected reference image, and wherein for each aligning step only the respective unaligned image which is currently being aligned is being transformed. This feature may allow to reduce the computational burden related to transforming the unaligned image into an image aligned with the selected reference image.

According to at least one embodiment, the unaligned image to be aligned next will be discarded from the ordered stack of images if all of the amounts of determined misalignments are above a certain threshold, and in such case the discarded image may optionally further be replaced by an interpolation of already aligned images, and/or an aligned image will not be used for further misalignment determining steps if its amount of misalignment in the current misalignment determining step is above a certain threshold in contrast to the remaining amounts of misalignment. This feature may allow to increase the robustness of the alignment and to reduce the sensitivity of the aligning with respect to local deformations.

According to at least one embodiment, before determining the respective misalignments, at least one of the images is converted into another signal space so that all images are in comparable signal space. This feature may allow to align images of different stain while keeping the simple matching criterion. This feature may also allow to use a signal space which enables improved or further simplified determination of misalignments.

According to at least one embodiment, the apparatus comprises a motion estimator for determining the respective misalignments by motion estimation so that each misalignment is described by an estimated displacement field. The motion estimator may allow a fast and computationally efficient determination of the amounts of misalignment.

According to at least one embodiment, the respective misalignments are determined by object recognition. This feature may allow to further increase the robustness of the aligning process.

According to at least one embodiment, the respective misalignments are determined by motion estimation so that each misalignment is described an estimated displacement field, and, if large amounts of misalignment repeatedly occur, the misalignments are then determined by object recognition instead of motion estimation. This feature may allow to automatically switch between a fast and simple misalignment determining process which is based on motion estimation and a more complex and robust misalignment determining process which is based on object recognition, so that the tradeoff between robustness and computational burden for the alignment is optimized under consideration of the misalignments determined in prior aligning iterations.

All of the above method steps are intended to be performed automatically or at least partially automatically.

Further embodiments are obtained by combining two or more of the individual features stated in the above paragraphs each beginning with "according to at least one embodiment". Therefore, these paragraphs stated above should not be interpreted such that an embodiment can only comprise a single features of the features stated above. Further embodiments of the apparatus are correspondingly obtained so that any apparatus which is adapted to perform a method representing an embodiment, is also an embodiment.

Furthermore, the present invention relates to a computer program product enabling a processor to carry out the method steps stated above and relates to a data carrier on which such computer program product is stored.

These and other aspects of the invention will be apparent from and elucidated with reference to the embodiments described hereinafter.

DETAILED DESCRIPTION OF EMBODIMENTS

In the following embodiments of the present invention will be explained in further detail in combination with the accompanying drawings.

Figure 1:
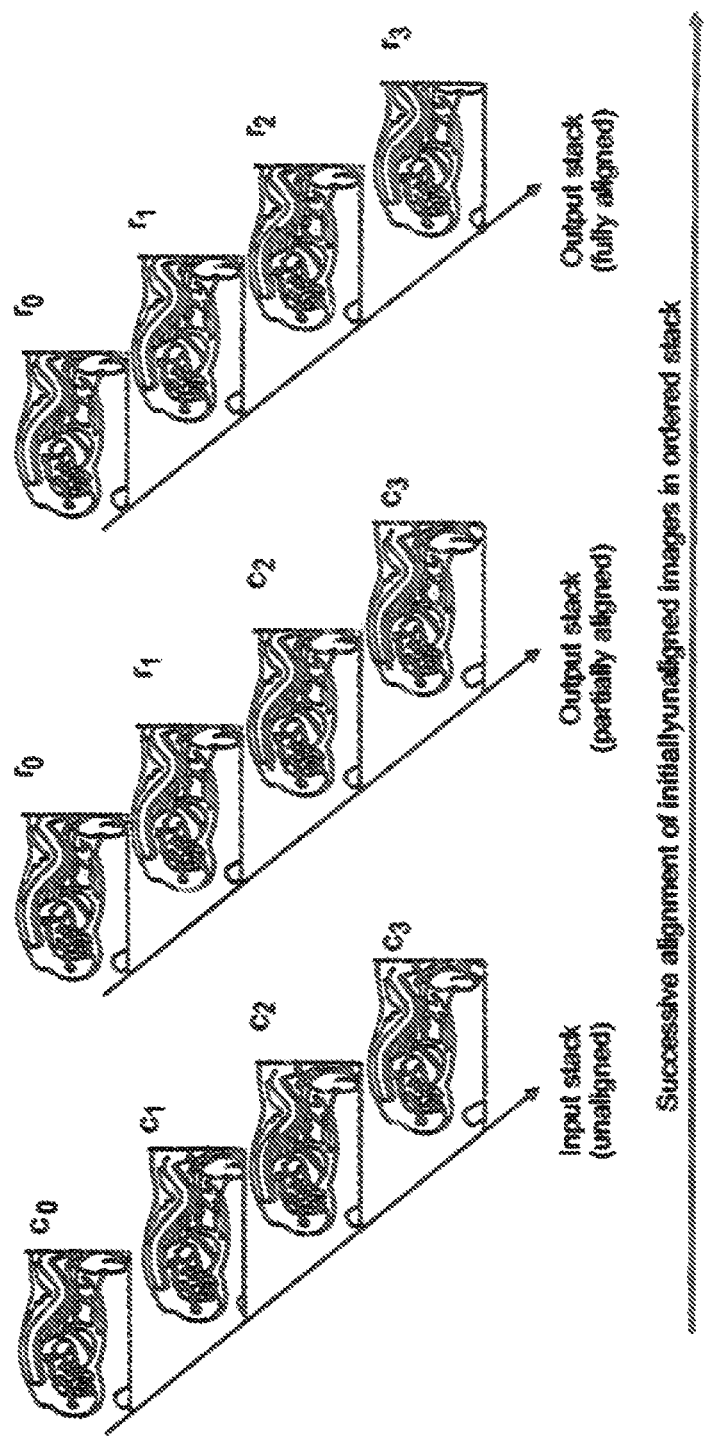
FIG. 1 illustrates a process of successively aligning an ordered stack of images from a specimen.

FIG. 1 illustrates a process of successively aligning an ordered stack of images from a specimen (which is e.g. a sliced specimen). As shown in FIG. 1, prior to the alignment of the ordered stack of images, the stack is considered to be fully unaligned and comprises four unaligned images $c_0$, $c_1$, $c_2$, and $c_3$. By successively or recursively aligning the images in the stack which are still unaligned based on already aligned images, as e.g. shown in the middle of FIG. 1 which shows already aligned images $r_0$ and $r_1$ and images still to be aligned $c_2$ and $c_3$, the ordered stack of images can be fully aligned so that all initially unaligned images $c_0$, $c_1$, $c_2$, and $c_3$ are transformed into aligned images $r_0$, $r_1$, $r_2$, and $r_3$. In the following, the notation used for FIG. 1 will be used throughout the remaining description: unaligned images will be denoted by reference sign c whereas images already aligned will be denoted by reference sign r. The respective position of the image (irrespective whether unaligned or aligned) in the ordered stack is denoted by a subscript ordinal number, so that e.g. aligned image $r_1$ is surrounded by aligned image $r_0$ and unaligned image $c_2$, as exemplarily shown in the middle of FIG. 1.

Figure 2:
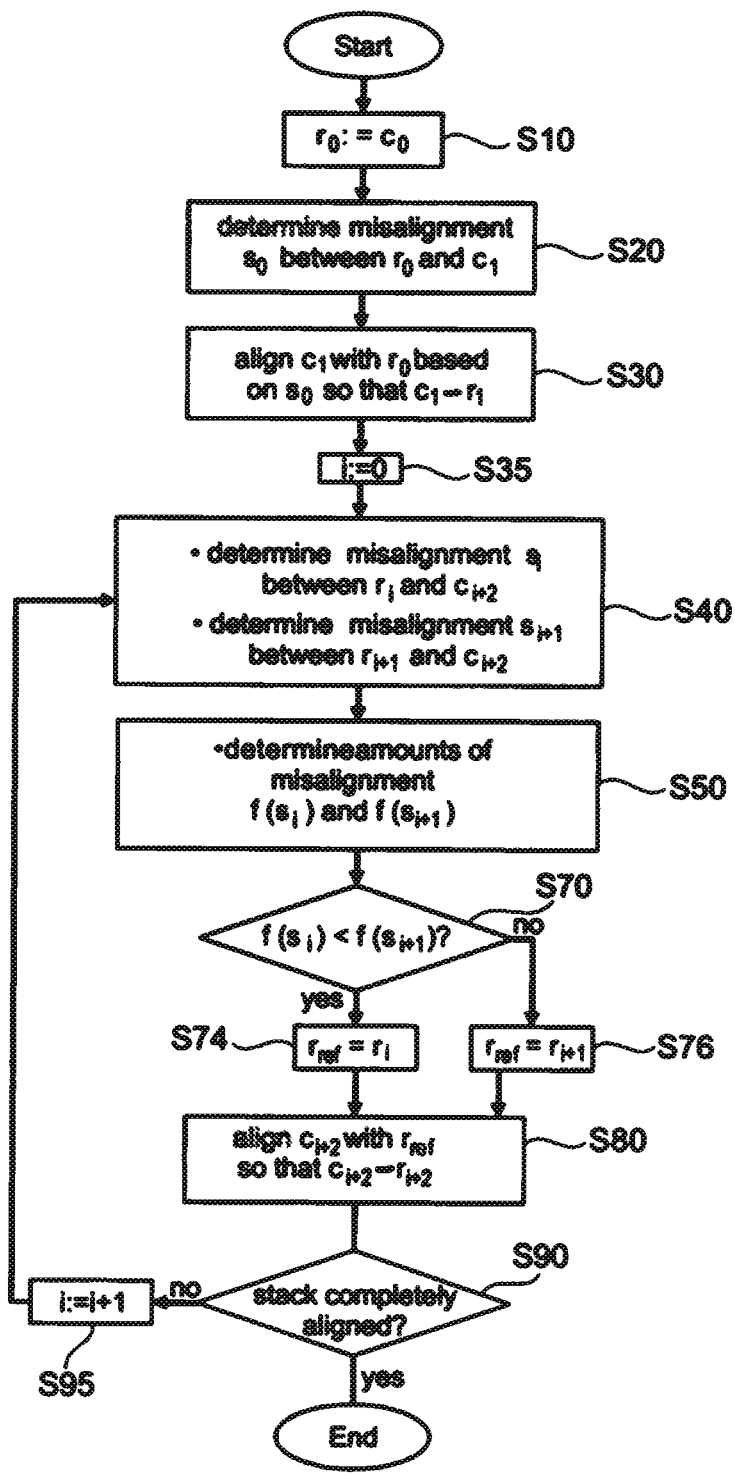
FIG. 2 is a flowchart diagram for illustrating a method for aligning an ordered stack of images from a specimen according to at least one embodiment of the present invention.

FIG. 2 is a flowchart diagram for illustrating a method for aligning an ordered stack of images from a specimen according to an embodiment of the present invention.

At the beginning of the method according to at least one embodiment, in step S10 of FIG. 2, one unaligned image c of the ordered stack is determined to be an aligned image r without alignment transformation: $r_0=c_0$. Thus, this image is chosen as the starting point for successively aligning the images of the ordered stack. Although in step S10 of FIG. 2 the image with ordinal number 0 is chosen as the starting value, the method is not restricted to this starting position. Any position in the ordered stack of images can be chosen, e.g. the middle position of the stack. Moreover, the starting position can be determined so that an image is selected as starting point that is expected to have the least amount of misalignment due to manual preparation. This could e.g. be the image having the smallest cross-section as the absolute amount of deformation can be expected to be the least. However, for other reasons this could also be the image covering most of the sliced surface.

In step S20, then the misalignment so between the aligned image $r_0$ and the next image to be aligned $c_1$ is determined. Suitable ways of determining the misalignment s will be discussed below.

Then, in step S30 image c1 is aligned with $r_0$ based on determined misalignment $s_0$ so that an alignment transformation is performed which leads to $c_1 \rightarrow r_1$. In the following the notation $c_i \rightarrow r_i$ will be used to denote that the (former) unaligned image $c_i$ has been transformed into an aligned image $r_i$.

In step S35, then the position pointer i is set to 0 for setting the starting position for the recursive method according to at least one embodiment of the present invention. Similar to the above mentioned for non-recursively performed step S10, position pointer i could also be set to any other suitable value. The value i=0 is chosen only for simplifying the following explanation. The non-recursively performed steps S10 to S35 are only optional for the method according to at least one embodiment.

Now, the recursively performed steps of the method for successively aligning the ordered stack of images will be explained. In step S40, the misalignment $s_i$ between the aligned image $r_i$ and the unaligned image to be aligned next $c_{i+2}$ and the misalignment $s_{i+1}$ between the aligned image $r_{i+1}$ and the unaligned image to be aligned next $c_{i+2}$ are determined.

In the next step S50, the respective amounts of misalignments $f(s_i)$ and $f(s_{i+1})$ are determined for the misalignment $s_i$ and $s_{i+1}$, respectively. Determining the amount of misalignment means that a quantity $f(s)$ is derived from the misalignment s so that quantity $f(s)$ can be used for comparison purposes. Most simply, quantity $f(s)$ is calculated as the absolute magnitude of misalignment s. If misalignment s is represented as a vector, quantity $f(s)$ can be alternatively calculated as the sum of the absolute values of the vector components (which is the same as calculating the summed absolute difference (abbreviated as SAD) because the misalignment s is already a difference vector), or as the mean squared error (MSE) of the values of the vector components.

In step S70, then the amounts of misalignments $f(s_i)$ and $f(s_{i+1})$ determined in step S50 are compared to each other. In case that $f(s_i)$ is smaller than $f(s_{i+1})$, aligned image $r_i$ is the image with which the image to be aligned next $c_{i+2}$ has the smallest amount of misalignment, so that aligned image $r_i$ will be selected as reference image $r_{ref}$ in step S74. In case that $f(s_i)$ is greater than or equal to $f(s_{i+1})$, aligned image $r_{i+1}$ is the image with which the image to be aligned next $c_{i+2}$ has the smallest amount of misalignment, so that aligned image $r_{i+1}$ will be selected as reference image $r_{ref}$ in step S76.

After selecting $r_{ref}$ in step S74 or step S76, in step S80 the image to be aligned next $c_{i+2}$ is aligned with $r_{ref}$ including an alignment transformation of $c_{i+2}$ into $r_{i+2}$ so that: $c_{i+2} \rightarrow r_{i+2}$. This alignment transformation is performed based on the determined misalignment $s_i$ (if $r_{ref}$ has been selected in step S74) or on the determined misalignment $s_{i+1}$ (if $r_{ref}$ has been selected in step S76). After alignment transformation in step S80, it is checked in step S90 whether the ordered stack of images is completely aligned, i.e. whether no unaligned image c is left. If the stack is not completely aligned yet, i.e. there are still images to be aligned in the stack, position pointer i is incremented by one in step S95, and then the next recursion (or iteration) of performing steps S40 to S90 for aligning the next image is performed. If it is determined in step S90 that the stack has been completely aligned, the aligning method is completed and no further recursion will be performed.

In at least one embodiment of the present invention, the respective misalignments $s_i$, $s_{i+1}$ are determined by motion estimation so that each misalignment is described an estimated displacement field. The estimated displacement field can e.g. comprise at least on displacement vector which describes how to shift pixels in the image to be aligned for aligning this image to the selected reference image. The displacement vector can describe all possible misalignments such as translation, rotation, scaling and stretching. Such a displacement vector is also called motion vector.

For performing motion estimation to obtain displacement vectors or motion vectors, several algorithms have been proposed. Motion estimation can be seen as an optimization problem: a sometimes complex, but usually simple criterion function has to be minimized or maximized to find an output motion vector. There are brute force methods that simply try all possible vectors, in a predefined range, in order to be sure to obtain the global optimum of the criterion function. Also there are efficient approaches that test only the most likely motion vectors. This likelihood is usually determined by spatial or temporal proximity, and consequently temporal and spatial prediction vectors are useful in the efficient motion estimation algorithms. This can be done by a 3D recursive search block matching algorithm as described in the document of Gerard de Haan et al, "True motion estimation with 3D-recursive search block matching", IEEE transactions on circuits and systems of video technology, volume 3, number 5, October 1993. This document is fully incorporated by reference herein. This algorithm subdivides a frame into blocks of e.g. 8×8 pixels and tries to identify the position of this block in the next frame. The comparison of these locations makes it possible to assign a motion vector to each pixel block which comprises the ratio of the pixels replacement of the block and the time between two frames. The 3-D recursive search is a block based motion estimation algorithm employing a small number of MV (MV=motion vector) candidates obtained from spatio-temporal predictions. The 3-D recursive search algorithm assumes blocks are smaller than objects, so that the MV from a neighboring block is a good estimate for the MV candidate of the current block. The blocks are processed in a certain order, for example, from left to right and top to bottom, so that some neighboring blocks that have already been estimated for MVs can provide spatial MV candidates for the current block, while the other blocks that have not been processed take the MVs from the reference frame to provide a temporal MV candidate for the current block. For each MV candidate the motion estimation error is calculated. The candidate with the lowest motion estimation error is chosen as the output motion vector for that block. The algorithm uses a normal raster scan order to go through the blocks. At least one of the embodiments of the present invention employs such a block matching algorithm for obtaining respective displacement fields. Advantageously, the 3D recursive search block matching algorithm is used in at least one embodiment of the present invention as block matching algorithm. For low-cost real-time performance, the inventor proposes to use a fast recursive motion estimator that provides spatio-temporal consistent displacement fields which are used to align the images in the stack. Further fundamental methods for motion vector determination that can be used for at least one embodiment of the present invention are described in U.S. Pat. No. 5,072,293 and US2008/0144716A1 which are both fully incorporated herein by reference.

In at least one embodiment of the present invention, the respective amounts of misalignments f(s) are calculated in terms of a respective matching error, e.g. $f(s_i)$, $f(s_{i+1})$, $f(m_i)$, $f(m_{i+1})$, which is calculated based on a predetermined matching criterion f. Such a matching criterion f which can be determined simply is the Summed Absolute Difference (SAD):

$$SAD(\vec{C}, \vec{X}, n) = \sum_{\vec{x} \in B(\vec{X})} |F(\vec{x} - \vec{C}, n-1) - F(\vec{x}, n)|,$$

where $\vec{C}$ is the candidate vector under test, vector $\vec{X}$ indicates the position of the block $B(\vec{X})$, $F(\vec{x}, n)$ is the luminance signal, and n the picture or field number. The motion vector that results at the output—one vector per block—is the candidate vector that gives the lowest SAD value. As an alternative to the SAD, as the matching criterion the Mean Squared Error (MSE) can be applied by squaring the absolute differences and then adding them up. Similarly, moments of $3^{rd}$ order can be applied as matching criterion f.

In at least one embodiment of the present invention, the aligning of the unaligned image c with the selected reference image $r_{ref}$ comprises transforming the unaligned image based on transformation parameters t describing how to the unaligned image has to be transformed in order to achieve alignment with the selected reference image. The transformation parameters t can be derived from the determined misalignment between the unaligned image and the selected reference image and in particular from the displacement field, displacement vector or motion vector which describes the determined misalignment. The computationally demanding transformation is only performed once per image to be aligned whereas the computationally cheap calculation of the respective matching errors is performed more than once per image to be aligned.

The images to be compared have to be in a comparable signal space. However, this is not the case if the images in the stack are stained with different stains (e.g. hematoxylin and eosin (H&E) and ImmunoHistoChemistry (IHC)). By transforming at least one of the images to the signal space of the other images or to a comparable signal space before minimizing the misalignment or the matching error, it is possible to keep or obtain the simple matching criterion.

According to at least one embodiment, the unaligned image to be aligned next will be discarded from the ordered stack of images if all of the amounts of determined misalignments s are above a certain threshold. The certain threshold may be a fixed value or may be determined adaptively, e.g. based on previously determined amounts of misalignment. The discarded image can be replaced by an interpolated image generated by an interpolation of aligned images. As input for the interpolation, aligned images located in the ordered stack next to the discarded image may be chosen. Moreover, an aligned image will not be used for further misalignment determining steps if its amount of misalignment in the current misalignment determining step is above a certain threshold while the remaining amounts of misalignment are below the certain threshold. The certain threshold may be a fixed value or may be determined adaptively, e.g. based on previously determined amounts of misalignment.

According to at least one embodiment, the respective misalignments are determined by object recognition. Compared to block matching algorithms for matching pixels, object recognition requires more computational efforts. On the other hand, object recognition works on higher level descriptors which are more robust than e.g. the SAD. However, not all object recognition techniques are suitable as basis for aligning an ordered stack of images. A suitable method for object recognition is an object recognition from so-called local scale-invariant features. One kind of this method is called SIFT (for Scale-Invariant Feature Transform) and has been introduced in "Object recognition from local scale-invariant features," David G. Lowe, International Conference on Computer Vision, 1999, pages 1150-1157. A very comprehensive description of the SIFT-method for object recognition is described in "Distinctive image features from scale-invariant keypoints," David G. Lowe, International Journal of Computer Vision, 2004, pages 91-110. Both documents are herein incorporated by reference. The SIFT-method transforms each local piece of an image into coordinates that are independent of image scale and orientation. Local invariant features allow to efficiently match small portions of cluttered images under arbitrary rotations, scalings, change of brightness and contrast, and other transformations. The idea is to break the image into many small overlapping pieces of varying size, each of which is described in a manner invariant to the possible transformations. Then each part can be individually matched, and the matching pieces checked for consistency. For image matching and recognition, SIFT features are first extracted from a set of reference images and stored in a database. A new image is matched by individually comparing each feature from the new image to this previous database and finding candidate matching features based in Euclidean distance of their feature vectors.

According to at least one embodiment, the respective misalignments are only determined by the above mentioned object recognition when relatively large amounts of misalignment have repeatedly occurred. Otherwise, if the amounts of misalignment mainly stay below a certain threshold, the respective misalignments are determined by fast and computationally simple motion estimation. The certain threshold may be a fixed value or may be determined adaptively, e.g. based on previously determined amounts of misalignment.

Figure 3:
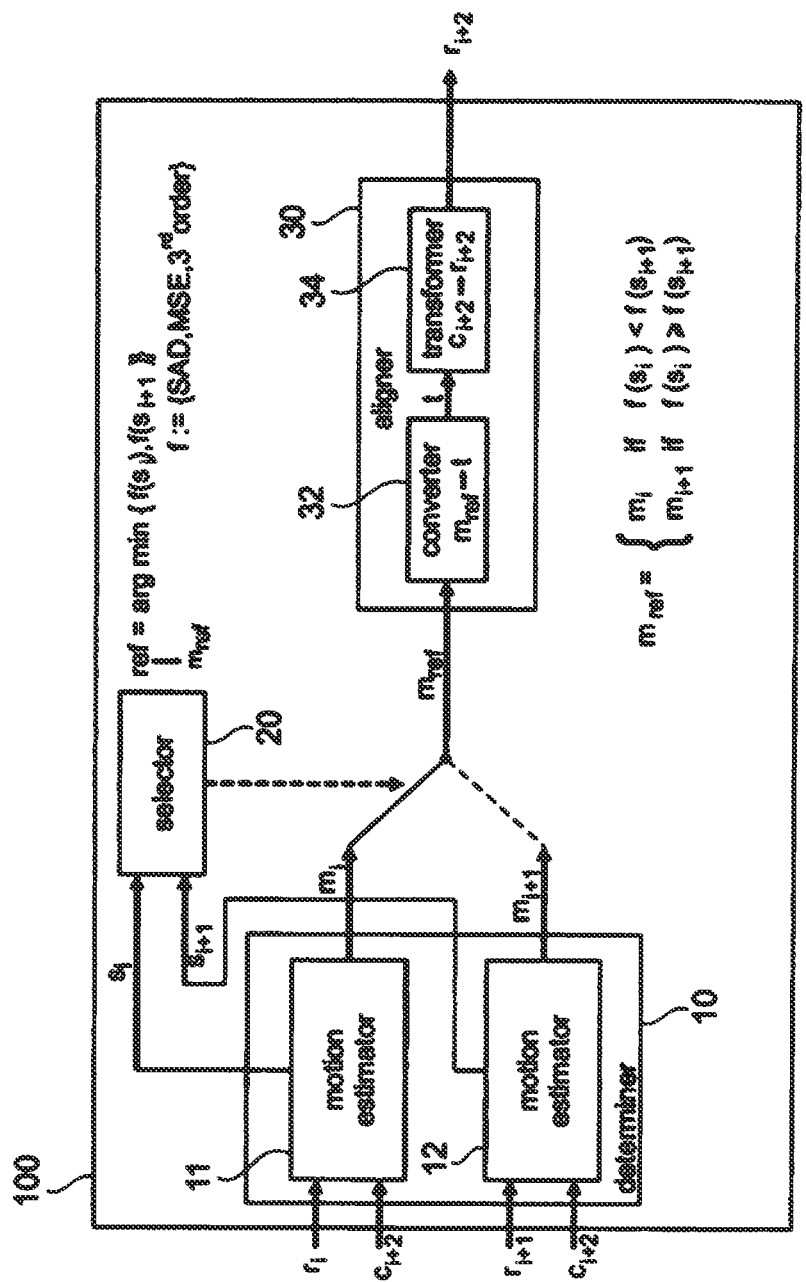
FIG. 3 illustrates an apparatus for aligning an ordered stack of images from a specimen according to an embodiment of the present invention.

FIG. 3 illustrates an apparatus for aligning an ordered stack of images from a sliced specimen according to at least an embodiment of the present invention. Apparatus 100 comprises a determiner 10, a selector 20, and an aligner 30. The determiner 10 includes two motion estimators 11 and 12. Motion estimator 11 receives at its input the aligned image $r_i$ and the image to be aligned next $c_{i+2}$. Motion estimator 11 is adapted to determine based on these inputs the misalignment $s_i$ and a displacement vector $m_i$ and to output them. Similarly, motion estimator 12 receives at its input the aligned image $r_{i+1}$ and the image to be aligned next $c_{i+2}$, and is adapted to determine based on these inputs the misalignment $s_{i+1}$ and a displacement vector $m_{i+1}$ and to output them. The output misalignments $s_i$ and $s_{i+1}$ are fed to selector 20. The output misalignments $s_i$ and $s_{i+1}$ can also be output as the corresponding displacement vectors $m_i$ and $m_{i+1}$, respectively, for being fed to selector 20 (in this case $s_i=m_i$ and $s_{i+1}=m_{i+1}$). Selector 20 applies a matching criterion, e.g. SAD, MSE or $3^{rd}$ order, onto the misalignments $s_i$ and $s_{i+1}$ received from the motion estimators 11 and 12. Applying the matching criterion results in calculating the matching errors $f(s_i)$ and $f(s_{i+1})$. Then, the selector 20 determines the minimum of these matching errors and selects from the displacement vectors $m_i$ and $m_{i+1}$ output from the motion estimators 11 and 12 that displacement vector having the smallest matching error as a reference displacement vector $m_{ref}$. By this reference displacement vector $m_{ref}$ the reference image $r_{ref}$ with which the unaligned image $c_{i+2}$ is to be aligned is implicitly selected. The selected reference displacement vector $m_{ref}$ is then fed from the corresponding motion estimator to the aligner 30. In the aligner 30, the reference displacement vector $m_{ref}$ is converted in converter 32 into transformation parameters t for transforming the unaligned image $c_{i+2}$. In the aligner 30, the transformation parameters t are output from converter 32 to transformer 34. Transformer 34 uses transformation parameters t for transforming the unaligned image $c_{i+2}$ into the aligned image $r_{i+2}$, so that $c_{i+2} \rightarrow r_{i+2}$. After completion of one aligning iteration for $c_{i+2}$, the next iteration can be started for $c_{i+3}$, with position counter i being incremented by one.

Although the embodiments described above are all based on determining two misalignments for aligning an unaligned image, this does not limit the present invention to determining only two misalignments. More than two misalignments can be determined for each aligning step. The reference image can be selected from more than two aligned images.

Although the embodiments described above are based on determining at least two misalignments between the unaligned image and at least two images immediately preceding the unaligned image, this does not limit the present invention to selecting the reference image from aligned images adjacent to each other and adjacent to the unaligned image.

Although in the examples described above, the ordered stack of images comprises only four images for explanation reasons, the stack size is not limited to this size. The ordered stack of images can comprise any number of images. Within the concept of the invention "determiner", "selector", "aligner", "motion estimator" is to be broadly understood and to comprise e.g. any piece of hard-ware (such a determiner, selector, aligner, motion estimator), any circuit or sub-circuit designed for performing a determination, selection, alignment, motion estimation as described as well as any piece of soft-ware (computer program or sub program or set of computer programs, or program code(s)) designed or programmed to perform a determination, selection, alignment, motion estimation as well as any combination of pieces of hardware and software acting as such, alone or in combination, without being restricted to the below given exemplary embodiments.

It will be appreciated by persons skilled in the art that the present invention is not limited by what has been particularly shown and described hereinabove. The invention resides in each and every novel characteristic feature and each and every combination of characteristic features. Reference numerals in the claims do not limit their protective scope. Use of the verb "to comprise" and its conjugations does not exclude the presence of elements other than those stated in the claims. Use of the article "a" or "an" preceding an element does not exclude the presence of a plurality of such elements.

The present invention has been described in terms of specific embodiments, which are illustrative of the invention and not to be construed as limiting. The invention may be implemented in hardware, firmware or software, or in a combination of them. Other embodiments are within the scope of the following claims.

LIST OF REFERENCE SIGNS

10 determiner
11 motion estimator
12 motion estimator
20 selector
30 aligner
32 converter
34 transformer
100 apparatus

The invention claimed is:

1. A method for aligning an ordered stack of images from a specimen, comprising successive acts of:
   determining, for at least two already aligned images of the ordered stack, the respective misalignments with an unaligned image which is to be aligned next in the ordered stack;
   from the at least two aligned images, selecting as a reference image that aligned image with which the unaligned image has the smallest amount of misalignment; and
   aligning the unaligned image with the selected reference image.

2. The method of claim 1, wherein the determining act determines the respective misalignments by motion estimation so that each misalignment is described by an estimated displacement field.

3. The method of claim 2, wherein the displacement field comprises at least one displacement vector describing how to shift pixels in the image to be aligned in order to align this image to the selected reference image.

4. The method of claim 2, further comprising acts of dividing into blocks the aligned images and the unaligned image to be aligned next, wherein the respective displacement fields are obtained by a block matching algorithm.

5. A method for aligning an ordered stack of images from a specimen, comprising successive acts of:
   determining, for at least two already aligned images of the ordered stack, the respective misalignments with an unaligned image which is to be aligned next in the ordered stack;
   from the at least two aligned images, selecting as a reference image that aligned image with which the unaligned image has the smallest amount of misalignment; and
   aligning the unaligned image with the selected reference image,
   wherein the respective amounts of misalignment are calculated in terms of a respective matching error between the respective aligned image and the unaligned image to be aligned next, wherein the matching errors are calculated based on a predetermined matching criterion, and wherein the aligned image having the smallest matching error is selected as the reference image.

6. The method of claim 1, wherein the aligning of the unaligned image with the selected reference image comprises transforming the unaligned image based on transformation parameters describing how the unaligned image has to be transformed in order to achieve alignment with the selected reference image, and wherein for each aligning act only the respective unaligned image which is currently being aligned is being transformed.

7. The method of claim 1, wherein the unaligned image to be aligned next will be discarded from the ordered stack of images if all of the amounts of determined misalignments are above a certain threshold.

8. The method of claim 7, wherein an aligned image will not be used for further misalignment determining acts if its amount of misalignment in the current misalignment determining act is above a certain threshold as compared to remaining amounts of misalignment.

9. The method of claim 7, wherein in such case the discarded image may further be replaced by an interpolation of already aligned images.

10. A method for aligning an ordered stack of images from a specimen, comprising successive acts of:
    determining, for at least two already aligned images of the ordered stack, the respective misalignments with an unaligned image which is to be aligned next in the ordered stack;
    from the at least two aligned images, selecting as a reference image that aligned image with which the unaligned image has the smallest amount of misalignment; and
    aligning the unaligned image with the selected reference image,
    wherein before the act of determining the respective misalignments, the method further comprises an act of converting at least one of the images into another signal space so that all images are in a comparable signal space.

11. A method for aligning an ordered stack of images from a specimen, comprising successive acts of:
    determining, for at least two already aligned images of the ordered stack, the respective misalignments with an unaligned image which is to be aligned next in the ordered stack;
    from the at least two aligned images, selecting as a reference image that aligned image with which the unaligned image has the smallest amount of misalignment; and
    aligning the unaligned image with the selected reference image,
    wherein the determining act determines the respective misalignments by object recognition.

12. The method of claim 1, wherein the determining act determines the respective misalignments by motion estimation so that each misalignment is described by an estimated displacement field and wherein, if large amounts of misalignment repeatedly occur, the misalignments are then determined by object recognition instead of motion estimation.

13. An apparatus for aligning an ordered stack of images from a specimen, comprising:
    a determiner comprising at least one of a processor, hardware, circuit, sub-circuit or non-transitory computer readable medium containing a computer program or sub program or set of computer programs, or program code(s), for determining for at least two already aligned images of the ordered stack the respective misalignments with an unaligned image which is to be aligned next in the ordered stack;
    a selector comprising at least one of a processor, hardware, circuit, sub-circuit or non-transitory computer readable medium containing a computer program or sub program or set of computer programs, or program code(s), for selecting from the at least two aligned images, as a reference image that aligned image with which the unaligned image has the smallest amount of misalignment; and
    an aligner comprising at least one of a processor, hardware, circuit, sub-circuit or non-transitory computer readable medium containing a computer program or sub program or set of computer programs, or program code(s), for aligning the unaligned image with the selected reference image.

14. The apparatus of claim 13, further comprising a motion estimator comprising at least one of a processor, hardware, circuit, sub-circuit and non-transitory computer readable medium containing a computer program or sub program or set of computer programs, or program code(s) for determining the respective misalignments by motion estimation so that each misalignment is described by an estimated displacement field.

15. The apparatus of claim 14, wherein the displacement field comprises at least one displacement vector describing how to shift pixels in the image to be aligned in order to align this image to the selected reference image.

16. A non-transitory computer readable medium storing a program for aligning an ordered stack of images from a specimen which, when executed by at least one processor, causes the at least one processor to perform acts of:
    determining, for at least two already aligned images of the ordered stack, the respective misalignments with an unaligned image which is to be aligned next in the ordered stack;
    from the at least two aligned images, selecting as a reference image that aligned image with which the unaligned image has the smallest amount of misalignment; and
    aligning the unaligned image with the selected reference image.

17. A method for aligning an ordered stack of images from a specimen, comprising successive acts of:
    determining, for at least two already aligned images of the ordered stack, respective misalignments with an unaligned image which is to be aligned next in the ordered stack;
    discarding the unaligned image to be aligned next from the ordered stack of images if all of the determined misalignments amounts are above a certain threshold;
    from the at least two aligned images, selecting as a reference image that aligned image with which the unaligned image has the smallest amount of misalignment; and
    aligning the unaligned image with the selected reference image,
    wherein each of the above acts are performed by at least one of a processor, hardware, circuit, sub-circuit and a non-transitory computer readable medium containing a computer program or sub program or set of computer programs, or program code(s).

18. The method of claim 17 comprising an act of replacing the discarded image with an interpolated image generated by an interpolation of the aligned images.

* * * * *